(12) United States Patent
Riebe et al.

(10) Patent No.: US 7,200,760 B2
(45) Date of Patent: Apr. 3, 2007

(54) SYSTEM FOR PERSISTENTLY ENCRYPTING CRITICAL SOFTWARE DATA TO CONTROL THE OPERATION OF AN EXECUTABLE SOFTWARE PROGRAM

(75) Inventors: Heinrich Henning Riebe, Vancouver (CA); David Aldis, Surrey (CA)

(73) Assignee: Protexis, Inc., Vancouver, B.C. (CA)

( * ) Notice: Subject to any disclaimer, the term of this patent is extended or adjusted under 35 U.S.C. 154(b) by 771 days.

(21) Appl. No.: 10/334,139

(22) Filed: Dec. 31, 2002

(65) Prior Publication Data

US 2004/0125954 A1    Jul. 1, 2004

(51) Int. Cl.
*G06F 1/24* (2006.01)

(52) U.S. Cl. ............ 713/194; 713/193; 713/189; 713/188

(58) Field of Classification Search ............... 713/194, 713/193, 189, 188
See application file for complete search history.

(56) References Cited

U.S. PATENT DOCUMENTS

| | | | |
|---|---|---|---|
| 3,798,359 A * | 3/1974 | Feistel | 380/37 |
| 3,906,460 A * | 9/1975 | Halpern | 711/115 |
| 3,958,081 A * | 5/1976 | Ehrsam et al. | 380/29 |
| 4,028,678 A * | 6/1977 | Moran | 711/115 |
| 4,037,215 A * | 7/1977 | Birney et al. | 711/202 |
| 5,748,741 A | 5/1998 | Johnson et al. | 380/28 |
| 5,809,145 A | 9/1998 | Slik et al. | 380/25 |
| 5,933,498 A * | 8/1999 | Schneck et al. | 705/54 |
| 6,009,525 A | 12/1999 | Horstmann | 713/200 |
| 6,012,033 A | 1/2000 | Vanden Berge | 705/1 |
| 6,044,471 A | 3/2000 | Colvin | 713/202 |
| 6,055,503 A | 4/2000 | Horstmann | 705/1 |
| 6,073,256 A | 6/2000 | Sesma | 714/38 |
| 6,088,452 A | 7/2000 | Johnson et al. | 380/28 |
| 6,192,475 B1 | 2/2001 | Wallace | 713/190 |
| 6,223,288 B1 | 4/2001 | Byrne | 713/190 |
| 6,243,468 B1 | 6/2001 | Pearce et al. | 380/255 |
| 6,314,409 B2 | 11/2001 | Schneck et al. | 705/54 |
| 6,334,189 B1 | 12/2001 | Granger et al. | 713/200 |
| 6,343,280 B2 | 1/2002 | Clark | 705/55 |
| 6,385,596 B1 | 5/2002 | Wiser et al. | 705/51 |
| 6,446,211 B1 | 9/2002 | Colvin | 713/202 |
| 2001/0013064 A1 | 8/2001 | Cox et al. | 709/220 |
| 2001/0056539 A1 | 12/2001 | Pavlin et al. | 713/193 |
| 2002/0091645 A1 | 7/2002 | Tohyama | 705/59 |
| 2002/0107809 A1 | 8/2002 | Biddle et al. | 705/59 |
| 2002/0138441 A1 | 9/2002 | Lopatic | 705/59 |

* cited by examiner

*Primary Examiner*—Thomas R. Peeso
(74) *Attorney, Agent, or Firm*—Roylance, Abrams, Berdo & Goodman, L.L.P.

(57) ABSTRACT

A data encryption/decryption system is provided which maintains in encrypted form one or more critical data elements required by a software program. A user must obtain a license key in order to decrypt the critical data elements before the software program can use them. The data elements can be chosen such that their contents provide a control mechanism for the correct operation of the executable software program. The system allows for the inclusion of different data elements with or within a single version of the software program. The different data elements are encrypted for different license keys to allow for different license options and corresponding levels of control and flexibility in the delivery of the software program.

24 Claims, 6 Drawing Sheets

SYSTEM FOR PERSISTENTLY ENCRYPTING CRITICAL SOFTWARE DATA TO CONTROL THE OPERATION OF AN EXECUTABLE SOFTWARE PROGRAM

CROSS-REFERENCE TO RELATED APPLICATIONS

Related subject matter is disclosed and claimed in co-pending U.S. patent application Ser. No. 10/126,973, filed by Shannon Byrne et al on Apr. 22, 2002; and in co-pending U.S. patent application Ser. No. 10/126,974, filed by Shannon Byrne et al on Apr. 22, 2002; all of said applications being expressly incorporated herein by reference.

FIELD OF THE INVENTION

The present invention relates to content and software protection and, more specifically, to a system for encrypting critical data within a software program to protect critical elements of that program and control its execution.

BACKGROUND OF THE INVENTION

Software is generally sold as a right to use. In other words, the use of the software is marketed and sold but not the software itself. It is important to protect the software itself from intentional, as well as inadvertent copying. Simple lock/unlock protection does not offer adequate flexibility for the user or the owner of the software. It would be useful to offer a range of control, including a very fine level of control, of the action and operation of a specific functionality within a software program.

Encryption of software programs offers a means to hide or shield important proprietary intellectual property (i.e., the software) from those who may wish to abuse the license terms and copy the software or a portion thereof. A substantial problem for software publishers and legitimate resellers is piracy of software programs. Piracy can occur in a number of forms such as the unlocking of protected software for illegal copying and retail sale, as well as the installation of unlocked software onto more computers than permitted under the software license agreement. A need exists for an encryption/decryption system for software programs to restrict the use of unlocked software to the situations intended by the software publisher.

Existing encryption systems and methodologies commonly employ encryption of one or more executable files in order to block the installation or stop the unlicensed execution of the software. Standard encryption methodologies commonly entail 'wrapping' the entire set of executable programs or files. These encrypted programs must then be unencrypted or unwrapped in order to be executed on the user's computer. Such unwrapping has a number of disadvantages. Once the program is unwrapped, it may be vulnerable to copying. In addition, the unwrapping process can require a substantial amount of free memory or disk space (e.g., on the order of two to three times the memory needed for the actual program) during the decryption process. The vulnerability of an unwrapped program to copying is addressed in commonly-assigned U.S. Pat. No. 6,223,288 whereby the executable file is persistently locked to a user's hardware through a hardware hash mechanism. U.S. Pat. No. 6,223,288 is hereby incorporated in its entirety herein for all purposes.

Another common locking process involves embedding license checks within the software executable(s) themselves through an Application Programming Interface or API which is commonly part of an activation-based system. While this process has the advantage of not requiring substantial memory or disk storage for decryption, pirates using standard software debugging tools commonly break the protection. The actual lock is not broken through this process, but the protection can often be removed through patches that overwrite or circumvent the license checks. With this technique, increased protection and effectiveness can be achieved through increased complexity in the nature and integration of the license validation checks. This increased complexity, however, may have the undesirable effect of increasing the initial protection setup investment, as well as the routine maintenance and quality assurance efforts for the developers of the software product.

Software executables represent one of three forms of digital content. These three content forms are:
1. Executable Content—data that consists of machine instructions that are directly processed by the target hardware; it is usually stored in the form of individual files (e.g., common software applications).
2. Viewable Content—data that can only be viewed (or played) by programs that understand the particular data format and are able to correctly interpret it; it is typically stored either as individual files or as data elements within an application or a database (e.g., music, pictures, video, written works).
3. Usable Content—data that belongs to and is processed by a particular application; it is often stored as data elements within the application, also as files or as elements within a database (e.g., tax tables, algorithmic control parameters). This data may be proprietary, or not, and it arranged in a manner such that it is usable by a software program.

Existing licensing systems are primarily directed at the first form of content described above to prohibit copying of, or operation of, executable software code. There are a number of systems that address viewable content, the second content form described above. A need exists for a content protection system that is primarily applicable to the third form of content described above, that is, usable content, and that impacts the interaction between the first and third forms of content (i.e., the use of static data with executable programs).

Further, a need also exists for a content protection system that can be adapted to support all three content forms since all forms of content may be used interchangeably. For viewable content such as digital pictures to be viewed with executable applications such as content players, a need exists for a content protection system that allows such content to be used, modified or stored according to algorithmic parameters that are themselves maintained as usable content. For example, it would be beneficial to have protected data elements that are required by algorithms controlling digital sound reproduction. Similarly, an executable program that works in conjunction with independent data such as fonts, virus files, and so on, could also benefit from maintaining this data in a protected form. A need exists for a content protection system that can provide basic functionality with an entry level product, as well as increasing functionality through decryption of the data required for that functionality. For data elements representing algorithmic variables, a need exists for a content protection system that provides programmatic execution control ranging from very coarse control (e.g., as an overall gate or switch on the primary program) to very fine control of a specific function such that, by selectively encrypting parameters for just one or two algorithms, very specific functions can be disabled or controlled through a limited or extensive range.

SUMMARY OF THE INVENTION

In accordance with the present invention, a content protection system is provided which allows content publishers to select and encrypt data elements within an executable program, as opposed to encrypting the entire executable program. The data elements can be stored within the program as static data or stored as external dataset or retrieved from a database. The data elements comprise usable data that supports usable, viewable and executable forms of content.

In accordance with another aspect of the present invention, the content protection system allows critical program data required for initialization and control of a program execution, proprietary algorithms and other critical calculation parameters to be encrypted with a license key prior to distribution to end users and recovered during execution of the program. The program can be constructed to operate sub-optimally if the required license key is not made available at execution time to increase the value of the properly licensed software. This protects the software from common piracy through circumvention of license check functions as the required data will remain encrypted despite the compromised license check functions.

The content protection system of the present invention allows flexibility with respect to encrypting multiple datasets and thus provides license options. For example, the present invention provides programmatic execution control ranging from coarse to fine control and/or varying levels of functionality, depending on the level of legitimate user access obtained via license key or activation technology.

BRIEF DESCRIPTION OF THE DRAWINGS

The novel features and advantages of the present intervention can be understood by reference to the detailed description of the preferred embodiments which follows, when read in conjunction with the accompanying drawings, in which.

Throughout the drawing figures, like reference numerals will be understood to refer to like parts and components.

DETAILED DESCRIPTION OF THE PREFERRED EMBODIMENTS

Figure 1:
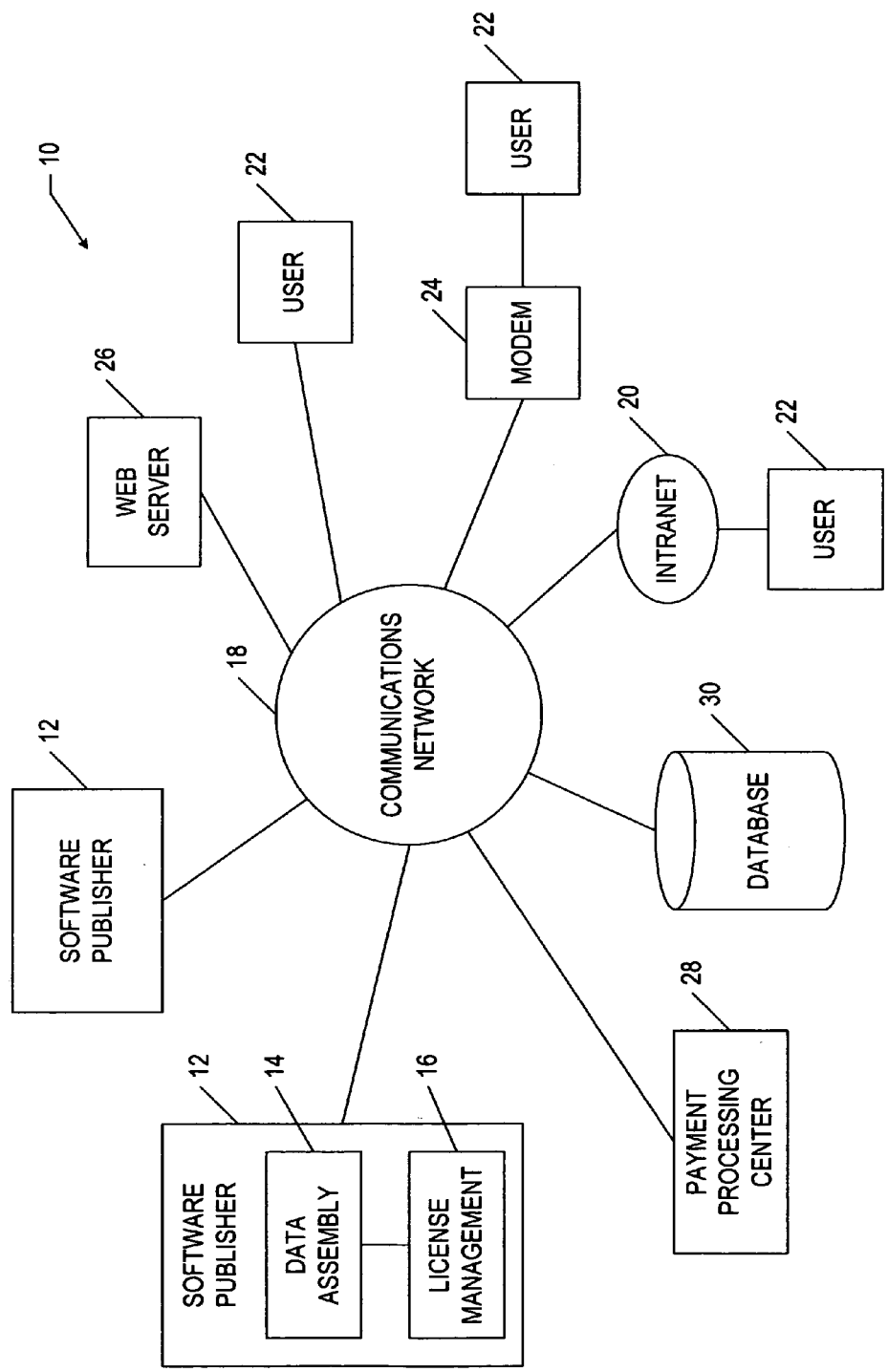
FIG. 1 is a schematic block diagram of a communications network comprising a software publisher configured with a content protection system in accordance with an embodiment of the present invention.

FIG. 1 depicts an exemplary system for content distribution and protection in accordance with an embodiment of the present invention. Software publishers 12 provide content such as software to users 22 via different distribution channels such as by shipping product media (not shown) or transmitting software electronically over a network 18 (e.g., an intranet 20, the internet, LAN, WAN, and so on). A payment processing center 28 or other e-commerce system component is preferably provided to provide users with immediate fulfillment capability. Software publishers preferably comprise a data assembly module 14 with which to select content to be protected and the method of protection, as well as a license management module 16 for providing and tracking licenses for protected content.

The present invention offers a novel approach wherein one or more program data elements are encrypted (e.g., by a publisher 12). The data elements can be stored within a program executable, referred to as static data, stored as an external dataset (file), or retrieved from a database. Data stored externally in files can be located and accessed in any way appropriate for the application's requirements such as, for example, locally on a fixed or removable storage media, or via the Internet, a LAN or a similar networked connection. The data elements can also be stored within any common database 30 and retrieved through database queries as required (e.g., via a web server 26).

Figure 2:
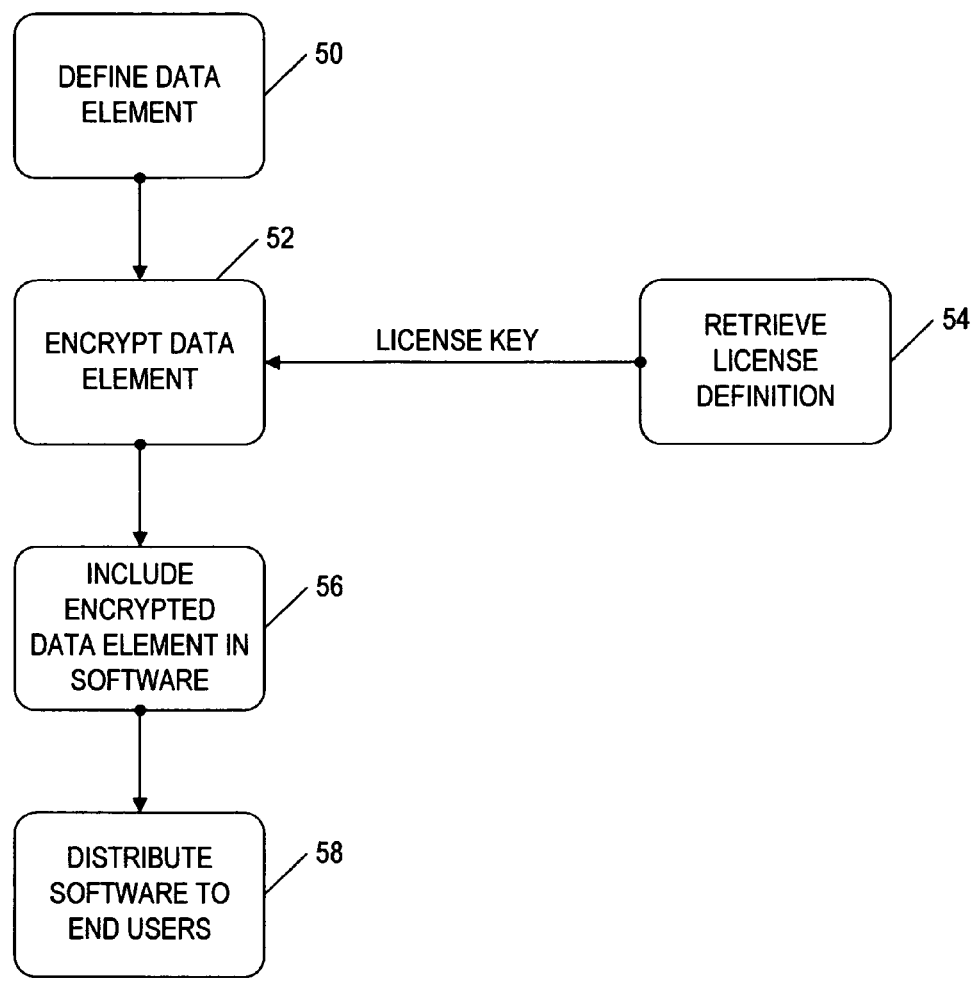
FIG. 2 is a flow chart illustrating a sequence of operations for encrypting data using a content protection system constructed in accordance with an embodiment of the present invention.
Figure 3:
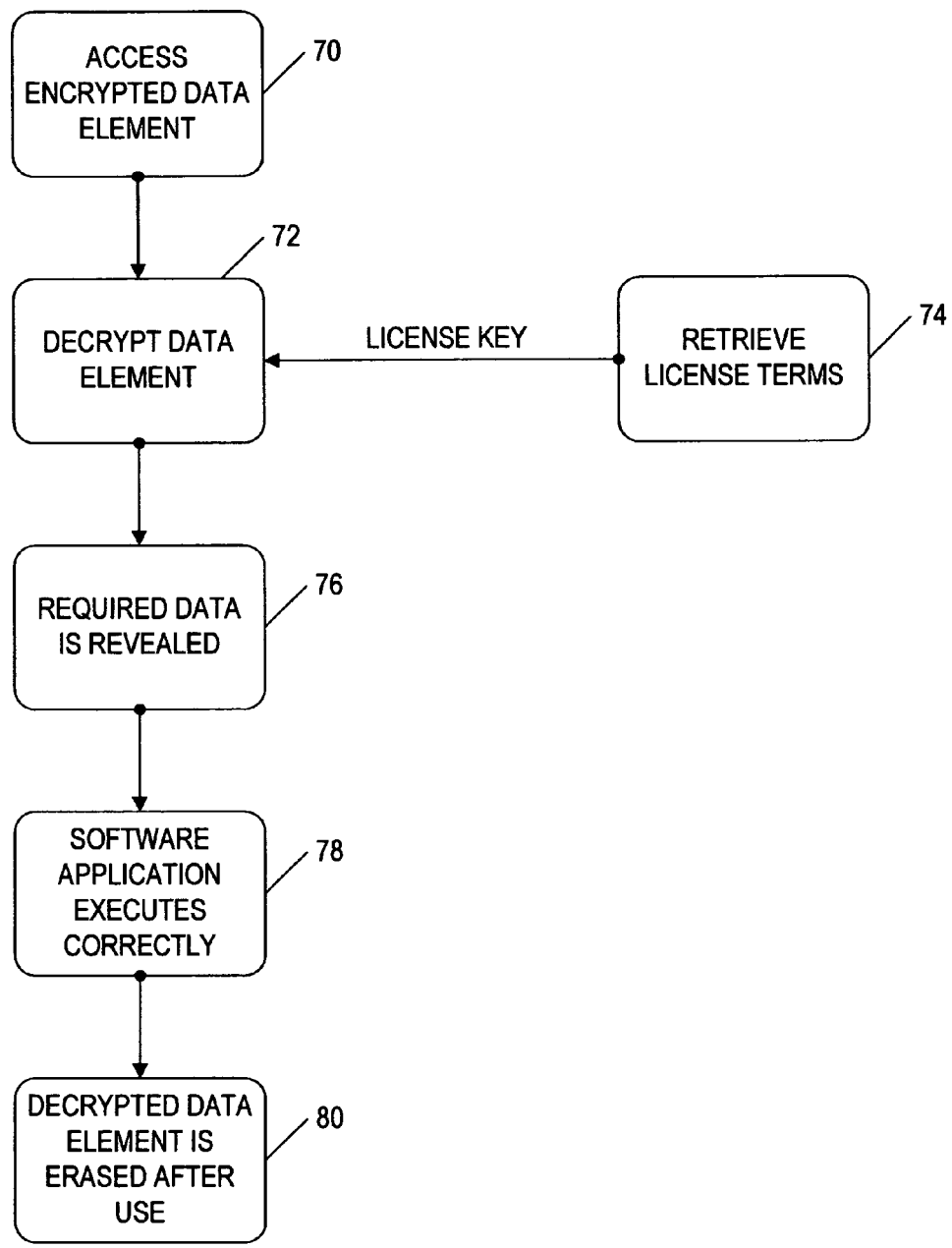
FIG. 3 is a flow chart illustrating a sequence of operations for decrypting data using a content protection system constructed in accordance with an embodiment of the present invention.

With reference to FIGS. 1 and 2, the contents of these data elements can be chosen by the publisher 12 (block 50) to include information that, in turn, controls the operation of the executable program (block 56). Utilizing this approach, critical program data required for the initialization and control of program execution, proprietary algorithms and other calculation parameters can be encrypted (blocks 52 and 54) prior to distribution (block 58) to end users 22 and recovered during the execution of the software program. As shown in FIG. 3, a user 22 accesses (block 70) an encrypted data element by decrypting it (blocks 72 and 74). The software executes correctly (block 78) once the decrypted data is revealed (block 76). The decrypted data is then preferably erased after use (block 80).

Figure 4:
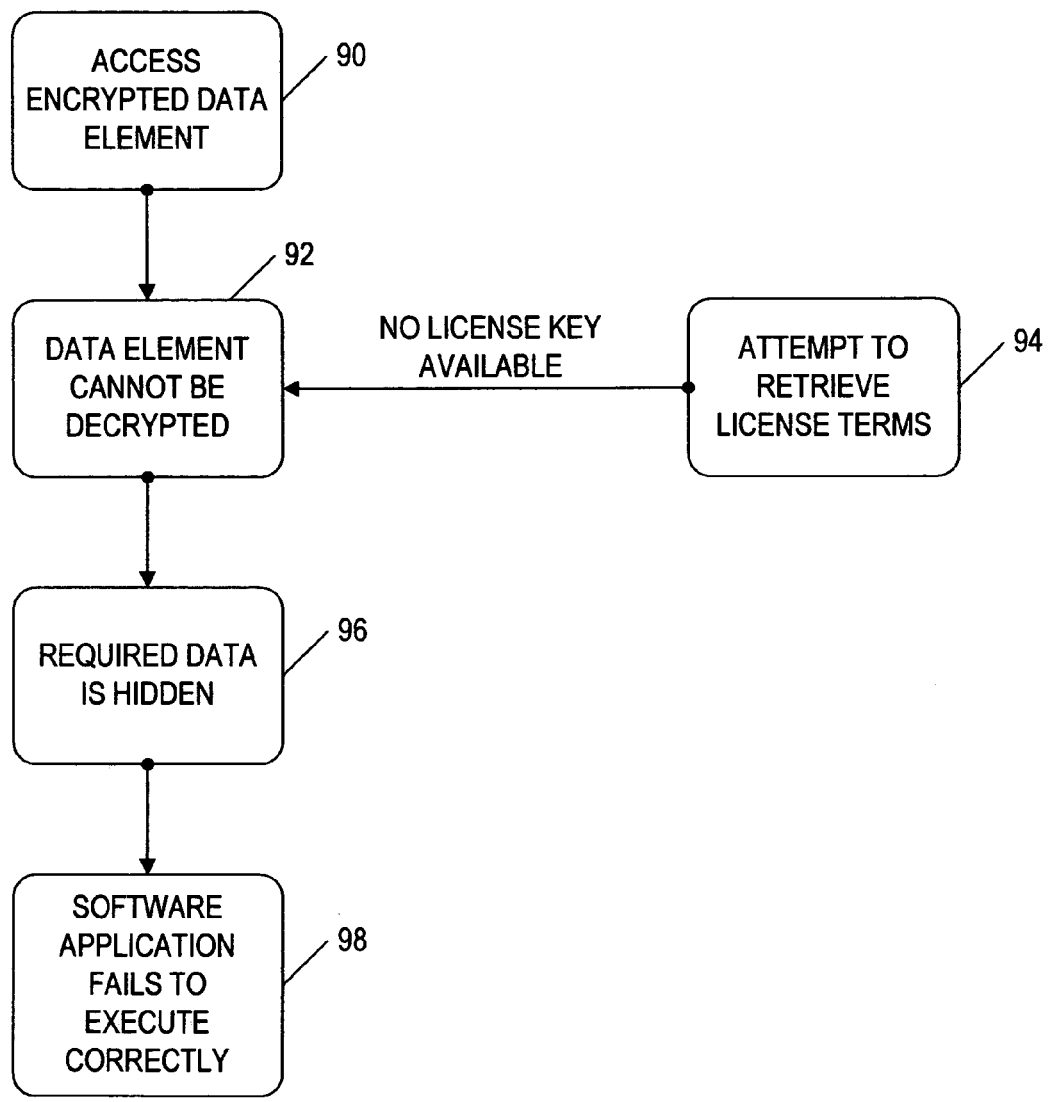
FIG. 4 is a flow chart illustrating a sequence of operations for incomplete decryption in accordance with an embodiment of the present invention.

Alternatively, the program can be constructed to operate sub-optimally should the required license key not be available at execution time. As illustrated in FIG. 4, a user 22 accesses (block 90) an encrypted data element but cannot decrypt it (blocks 92) because retrieval of the license terms (block 94) did not result in successfully locating a license key. The required data is not available without the key and, therefore, remains hidden (block 96), causing the software application to fail to execute correctly (block 98) or, alternatively, operate sub-optimally. Thus, common circumvention techniques cannot be used to create an unprotected copy of the program. Moreover, rather than simply stepping through a program in a debug mode and jumping over license check functions, a hacker or pirate must gain a much more complete understanding of the underlying algorithms to the extent of re-creating appropriate data elements. This requires substantially greater effort and understanding than is required to circumvent conventional license checks.

Figure 5:
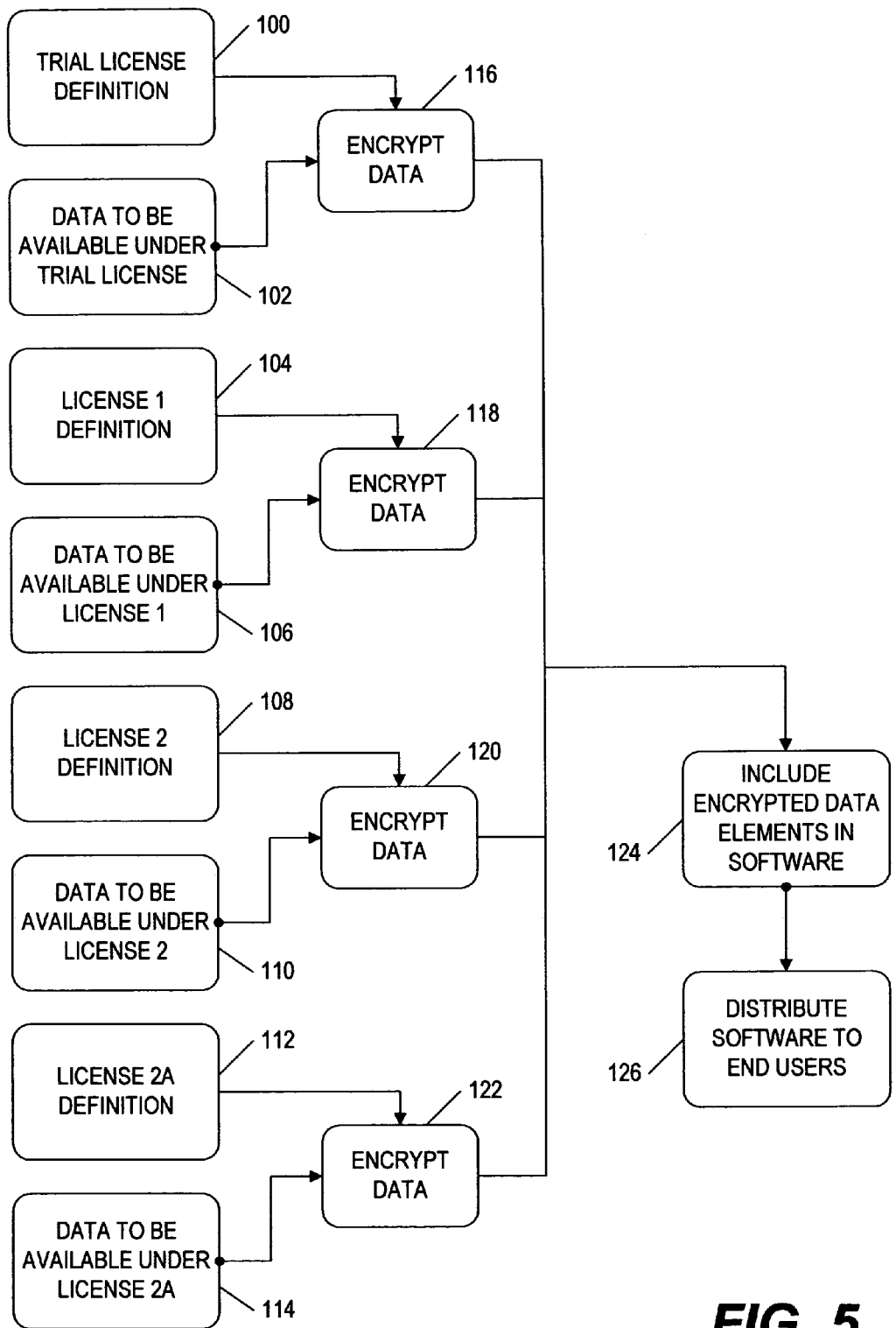
FIG. 5 is a flow chart illustrating a sequence of operations for encrypting multiple datasets and/or employing multiple licenses using a content protection system constructed in accordance with an embodiment of the present invention.

The present invention allows considerable flexibility in data delivery, as well as development and control of license options. As illustrated in FIG. 5, multiple data sets indicated by blocks 102, 106, 110 and 114 can be encrypted, as indicated by blocks 116, 118, 120 and 122, respectively. Each data set can be subject to different license terms, as indicated by blocks 100, 104, 108 and 112, respectively. The multiple data sets can then be delivered (blocks 124 and 126) to users 22 independently, or as part of a larger dataset.

Figure 6:
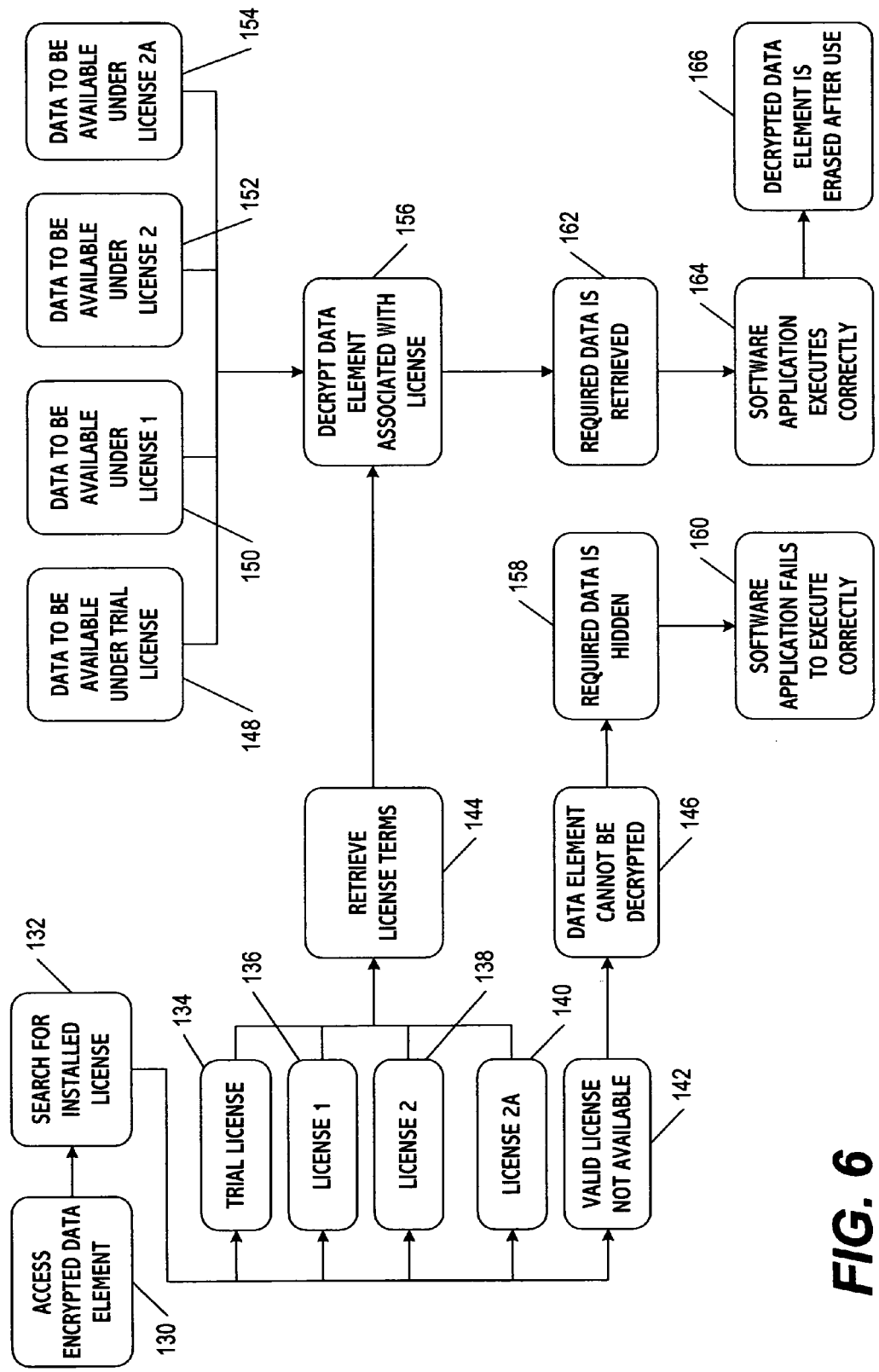
FIG. 6 is a flow chart illustrating a sequence of operations for decrypting a dataset employing multiple licenses using a content protection system constructed in accordance with an embodiment of the present invention.

As illustrated in FIG. 6, the encrypted data elements or data sets can be accessed (block 130) and searched (block 132) for an installed license (e.g., any of the licenses indicated by blocks 134, 136, 138 and 140). Once the selected license terms are retrieved (block 144), the corresponding data available under that license (e.g., the corresponding one of the data elements indicated by blocks 148, 150, 152 and 154) is decrypted (block 156). The software executes correctly (block 164) once the decrypted data is revealed (block 162). The decrypted data is then preferably erased after use (block 166). If a valid license is not available to the user 22 (block 142), the required data cannot be decrypted (block 146) without the key and, therefore, remains hidden (block 158), causing the software application to fail to execute correctly (block 160) or, alternatively, operate sub-optimally.

In accordance with the present invention, multiple data sets can be selectively unlocked according to license terms based upon an accompanying new license or according to the license terms of a previously provided executable application, previously supplied data or both. Decryption of the data, and hence program execution, can be controlled by the original software license and terms, by a new set of terms, or by a combination of the two. Thus, a dataset can be delivered or otherwise made available (e.g. as part of a standard update or a paid-for upgrade) to a program where the current license allows some degree of access to the data. A new license can then be delivered, such as through an integrated payment and fulfillment function, that allows access to additional data in a pre-existing or newly provided data file. This new data can, for example, enable new functionality or enhanced performance or both.

An example of the application of the present invention to a trial version of software is demonstrated by a data compression product. While the trial license is valid, the data compression product can provide a level of compression that provides a realizable benefit to encourage purchase, yet is far short of the fully licensed version capability. In accordance with the present invention, the level of compression is set through use of a variable lookup where a valid license receives a "0.5" constant representing 50% compression, replacing a default "0" constant representing 0% compression for an expired trial or fully unlicensed version. The present invention is advantageous in that this level of control can be set with relative ease. Upon receipt of a full license (e.g., through an Internet-based purchase process), the full capability is provided with a "1.0" constant representing 100% compression. All of these values can be provided as encrypted static data or a lookup in an encrypted data file, and the delivery of the appropriate value determined by the license key, in accordance with the present invention. A hacker or cracker can be further challenged through the use of quadratic equations and the substitution of exponents of the equation, for example, that then provide a non-linear nature to the data for what results in a linear benefit.

In contrast with existing methods of encryption that would encrypt the entire data compression software product, the present invention encrypts only a portion of the product such as the variable lookup in the foregoing example. Due to the relatively small size of the required buffer, decryption can occur repeatedly during program execution with very negligible impact on the efficiency of the program execution or the requirement for additional memory or disk storage. Moreover, the program maintenance effort is substantially reduced, as program security is no longer dependent on increasing the complexity of the licensing checks. A non-encrypted copy of the data elements can be used for most maintenance activities, and substituted just prior to final product build and distribution with the encrypted copy.

The data is protected persistently since it is only stored in its encrypted form within the executable binary program file. In other words, it is part of the program in an encrypted form. It never has to be stored in its unencrypted form. Where greater flexibility is required, the encrypted data elements can also be stored external to the program in files, or fields of a database, or anywhere appropriate to the application environment as noted above. The program retrieves the encrypted data elements when required from the external storage and then uses the data as though it were part of the program. The encrypted data elements can be updated at any time without changing the application program. Thus, external data is also never stored in unencrypted form and can be used to provide greater configuration flexibility. This is of value both for data changes that are required to keep the program operation up-to-date (e.g. tax tables or virus definitions), as well as to provide licensing flexibility (e.g. functionality that varies depending upon the license type, which may change over time for marketing reasons). This ability to update and change the data provides the additional benefit of reducing the requirements of a standard software build and quality assurance process. Updates and upgrades can be conducted far more expeditiously than with conventional practice and other licensing and protection approaches which require a completely new compile and build of the software elements.

Multiple versions of a data element (e.g., with different values) can be included with an application, each individually encrypted with a key specific to a different license. Some licenses can have associated data elements that have no counterpart in other licenses. The actual data element that the application eventually processes is then dependant on the particular license that the user has access to. In this way, the same application binary file, or software executable, can securely contain the data required for what would otherwise be multiple application binary files requiring separate manufacture and distribution. To upgrade the application's functionality, the user only needs to acquire an appropriate license to unlock the functionality already delivered with the application. Combined with an activation process as described below, this allows new application functionality to be unlocked instantly, without the need for new software to be delivered or installed.

The content protection system 10 of the present invention has the highly desirable capability of controlling critical program operations in an application-specific and a release-specific manner and allows the use of common binaries for multiple product configurations and markets. The actual software product is controlled by an encoded serial number sold with the license to use the software. Access to the encrypted buffer is provided through an activation code linked to a decryption key that is preferably locked to a hash of the unique hardware identification of the target computer. The activation code is only provided to holders of unused (i.e., previously unactivated) serial numbers per a central data store. This preferred technique allows activation codes to be conveniently supplied electronically over the Internet, or any other network, or even via e-mail, telephone or facsimile-based customer support. The provision of the activation codes can be further integrated with a payment module that can allow the user to select and purchase the desired software, as well as the desired software functionality. Activation methods are described in commonly-assigned U.S. Pat. No. 5,809,145, in U.S. application Ser. No. 10/126,973, filed Apr. 22, 2002 and in U.S. application Ser. No. 10/126,974, filed Apr. 22, 2002, which are all hereby incorporated by reference herein.

The following is an example of how the content protection system 10 of the present invention can be implemented. With regard to structuring the protection, the level of protection provided by the system 10 can be affected by the actual integration with the product to be protected. For example, at a high level, the integration can appear as follows:

Your program here . . .
If the system 10 says that the license is invalid
    Then quit
Otherwise
    Your program continues . . .

As stated previously, implementing the persistent protection in this manner presents crackers with a relatively easy target. Sophisticated pirates use conventional software debugging tools to trace code at runtime. Rather than look at the entire program in machine code, they only need to concentrate on the place where it stops. Overwriting the response to the above question (i.e. the quit instruction) effectively removes the protection without otherwise affecting the application.

The preceding example illustrates two points of vulnerability. First, the question, "if license valid" is easy to find due to its proximity to the obvious reaction, "quit". Secondly, the only application dependency on the question is the reaction. Once the reaction is removed, the program continues to function normally.

There are several ways of combating these problems. They are highly dependent upon the nature of the application, but this application-specific nature can often be used to a software publisher's advantage in accordance with the present invention. Recommendations on implementing the persistent content protection system 10 of the present invention can include, but are not limited to:

1. Separate the license verification from the decision to quit. After capturing the license verification, continue normally for some time or number of operations.
2. Use the value captured by the license verification to turn a variety of switches on or off or otherwise change values (even bits within pictures or sound files), creating some sequence of more complex, interdependent states that are then verified before quitting. This technique makes it less obvious which original value has led to the group of particular values that cause the program to quit. Simply overwriting one or two values near to where the application quits will not be sufficient to crack the program.
3. Quit in several places according to different conditions.
4. Assume that the "quit" reaction is so obvious that it, and the conditions leading to it, will eventually be circumvented by a dedicated cracker. Given this assumption, the program to be protected should also react in a less obvious way. A cracked application may run, but the failed or missing license verification leads to a crippled state that is very difficult to override. This tactic is application—dependent and is therefore an effective means of making use of the protection the present invention provides. An example of this is where critical application functions are delivered defective and the correct license verification is required so that the application can "repair" itself.

The trade-off with more elaborate implementation methods can be an ever-increasing load on the testing and quality assurance team. A carefully planned application can use compile time switches to turn the protection mechanisms off so that the program functionality can be tested and verified independently of the copy-protection mechanisms. Careful control of any such versions is important to avoid inadvertent release of unprotected product.

To counteract the constant efforts of professional pirates and deliberate crackers to compromise protected code, the present invention augments the complex task of providing execution level protection of software with easy to manage data level protection.

By way of an example, the following exemplary routine decrypts a given buffer only if a valid license is present:

PsiDecryptBuffer

```
PSIERROR __stdcall PsiDecryptBuffer(
    LPCTSTR szLicenseID,
    const BYTE *pbInBuffer,
    BYTE *pbOutBuffer,
    UINT *puiOutBufferLen,
    const BYTE *szInstanceTag
)
```

Parameters

| | |
|---|---|
| SzLicenseID | The null-terminated product license identifier. |
| pbInBuffer | Address of the encrypted buffer. |
| pbOutBuffer | The address of the buffer that will receive the decrypted data. |
| puiOutBufferLen | Pointer to a variable that contains the size, in bytes, of the buffer pointed to by pbOutBuffer. When the function returns, then this variable will contain the length of the data returned. |
| szInstanceTag | The unique, null-terminated tag was created for this buffer during the encryption process. |

Return Value

| | |
|---|---|
| PSIERROR_NOERROR | No error occurred (see below). |
| PSIERROR_INVALID_VERSION | The buffer encryption is incompatible with the PSIKey version (PSIKey is older). |
| PSIERROR_PARAMETER_INVALID | One of the parameters is invalid. |
| PSIERROR_MORE_DATA | The supplied output buffer length is too short for the decrypted data; the size of buffer required is returned in puiOutBufferLen. |

As stated previously, this routine decrypts the given buffer only if a valid license is present. The buffer is preferably encrypted specifically for the given product. Encrypting some of an application's key data protects the application from being altered to remove the copy protection features. Ideal candidates for encryption are values that are required for the correct functioning of the application, especially values that are not easily guessed. This function of the present invention can also be used to hide sensitive data or other proprietary information.

The encrypted data is preferably in the form of a hexadecimal string. As this string may be long, a software publisher can use the line continuation syntax for constants as defined by the source language.

To maintain the highest level of security, the buffer is preferably only encrypted for a particular license, that is, a buffer can only be encrypted for a product's normal license or the trial license, but not simultaneously for both. If trialware is being released, any data that is required by both license types is encrypted twice as two separate buffers. The buffer that is appropriate for the currently installed license (e.g., as determined by PsiVerifyRegistration and PsiVerifyTrial) must be passed to PsiDecryptBuffer, for example.

PsiDecryptBuffer preferably decrypts the buffer using only the installed license information. To hide its functionality, it does not generate any errors if the license is invalid or the buffer used requires a different license type. If the trial license expires, for example, the buffer appears to be decrypted but contains invalid data. In this way, not performing proper error checking allows a software publisher to disable some of the program's functionality unless a valid license is present. If a cracker is able to edit the executable, they cannot simply switch buffers to obtain access to the data requiring a full license.

Each encrypted buffer receives a unique Instance Tag that forms part of the cryptographic process used to protect the data. This makes each buffer a unique package, further reducing the opportunity to create a "universal crack".

Unregistered trialware is inherently more vulnerable to cracking than registered software. In accordance with the present invention, some data is only available to the fully licensed version. This can be accomplished either by including this data only in the fully licensed buffer, or by having a third buffer as illustrated by the following:

Using two buffers:

| Buffer | Contents |
| --- | --- |
| TrialBuffer | common data |
| NormalBuffer | common data, special data |

Using three buffers:

| Buffer | Contents |
| --- | --- |
| TrialBuffer | common data |
| NormalBuffer | common data |
| NormalBuffer2 | special data |

The buffer is preferably decrypted in all cases, and the program uses the decrypted data even if it is incorrect, as exemplified by the following code. An invalid license yields bad data that should lead to a malfunctioning program. This is preferred to error messages which may indicate to a cracker where to look in the executable code.

Normal Scenario:

```
// run application?
if PsiVerifyRegistration(...) != PSIERROR_NOERROR
    // actions to be taken for unlicensed software
...
// need something secret
PsiDecryptBuffer( NormalBuffer, ...)
// get the decrypted data we need
// clear the decrypted buffer!
```

```
// use the data
// wipe the data!
```

Trialware Scenario:

```
// show nag screen? run application?
if PsiVerifyRegistration(...) != PSIERROR_NOERROR
    if PsiVerifyTrialLicense(...) ...
    ...
...
// need something secret
if PsiVerifyRegistration(...) == PSIERROR_NOERROR
    PsiDecryptBuffer(NormalBuffer, ...)
Else   // always do this! no license, bad decryption!
    PsiDecryptBuffer(TrialBuffer, ...)
// get the decrypted data we need
// clear the decrypted buffer!
// use the data
// wipe the data!
```

In this way, a cracker who is able to edit the executable and circumvent the license validation remains without a properly running program. Keeping the decrypted data visible for the shortest possible time (i.e., decrypt the buffer on an as-needed or where-needed basis and clear the buffer and the data items as soon as possible after use) creates considerable work for someone wanting to patch the application to overcome the protection.

Certain products may require more complex persistent copy protection features, such as the routine, PsiDecryptBuffer. This routine decrypts a data buffer that has been encrypted for the given product. It will not function without a valid license. This can be used to hide various pieces of static program data so they are only selectively available at runtime in the presence of a valid license, thereby eliminating the ability for determined crackers and pirates to overwrite pieces of program code and obtain an unlicensed working copy of the product.

To provide persistent copy protection, it is not necessary to have any trade secret or otherwise confidential data, but rather only data that is required for the correct functioning of the application. Providing this data in an encrypted buffer effectively binds it to the license. Even if the encrypted values become known, it is difficult to edit the software to replace the encrypted portions with the unencrypted ones since the decryption calls must also be found and removed.

Hiding data values that are not readily ascertained outside of the application further increases the level of protection. A cracker must view the code at runtime to determine the required values. This functionality allows key portions of the software to be protected to be made invisible to static analysis by buffer encryption in accordance with the present invention.

An independent software or content vendor could utilize a licensing mechanism for each or all of the content types described above to provide and control a variety of market-optimized products. The value of such a system is clearly enhanced if the license parameters and mechanisms are consistent. The content protection system 10 of the present invention provides a common interface to support consistency in license definition, terms management, and so on, and therefore supports full integration between disparate executable, viewable and usable data types, which has heretofore been a significant challenge to content providers and distributors. The license terms can be held consistently through separate delivery of executable and usable content, including updates or upgrades to either. Use of digital licensing and a system such as the content protection system 10 of the present invention further allows the opportunity to modify the license itself to result in enhanced programmatic function and/or additional usable data. Similarly, license terms can be reset to reduce functionality such as where a computer has been relocated within an organization.

Utilizing the present invention, a content publisher or distributor can configure licenses that initially provide limited functionality or a basic content depth, and then provide a richer set of algorithmic capabilities or richer database upon legitimate acquisition of the appropriate license. The present invention makes this possible without the need to configure, distribute and manage different versions of the executable application.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A method of protecting a software program from piracy comprising the steps of:
    selecting at least one data element from said software program for encryption, said data element affecting operation of said software program and comprising usable data that supports any of usable, viewable and executable forms of content;
    encrypting said selected data element such that a user is required to obtain a valid license to decrypt said selected data element;
    distributing said selected data element and said software program to said user;
    decrypting said selected data element during runtime of said software program upon said user obtaining a valid license; and
    erasing the decrypted said selected data element after said software program executes correctly such that said selected data element is only available at runtime of said software program and in the presence of said valid license;
    wherein said data element is selected from the group consisting of program data required for at least one of initialization and control of execution of said software program, a proprietary algorithm, and at least one parameter.

2. A method as claimed in claim 1, wherein said data element is stored within a program executable of said software program.

3. A method of protecting a software program from piracy comprising the steps of:
    selecting at least one data element from said software program for encryption, said data element affecting operation of said software program and comprising usable data that supports any of usable, viewable and executable forms of content;
    encrypting said selected data element such that a user is required to obtain a valid license to decrypt said selected data element;
    distributing said selected data element and said software program to said user;
    decrypting said selected data element during runtime of said software program upon said user obtaining a valid license; and
    erasing the decrypted said selected data element after said software program executes correctly such that said selected data element is only available at runtime of said software program and in the presence of said valid license;
    wherein said data element is stored as an external dataset with respect to said software program.

4. A method as claimed in claim 3, wherein said external dataset is accessible locally with respect to said user.

5. A method as claimed in claim 3, wherein said external dataset is accessible remotely with respect to said user via a network.

6. A method as claimed in claim 3, further comprising the step of updating said selected data element in said external dataset without changing the code of said software program.

7. A method of protecting a software program from piracy comprising the steps of:
    selecting at least one data element from said software program for encryption, said data element affecting operation of said software program and comprising usable data that supports any of usable, viewable and executable forms of content;
    encrypting said selected data element such that a user is required to obtain a valid license to decrypt said selected data element;
    distributing said selected data element and said software program to said user;
    decrypting said selected data element during runtime of said software program upon said user obtaining a valid license; and
    erasing the decrypted said selected data element after said software program executes correctly such that said selected data element is only available at runtime of said software program and in the presence of said valid license;
    wherein said decrypting step further comprises the steps of
    receiving a user request for a key with which to decrypt said selected data element;
    generating an activation code linked to said key; and providing said activation code to said user; and
    wherein said activation code is locked to a hash of a unique hardware identifier associated with said user's computer.

8. A method as claimed in claim 7, wherein said distributing step comprises providing an encoded serial number with said license to use said software program, and said decryption step further comprises the steps of:
    receiving a user request for a key with which to decrypt said selected data element;
    generating an activation code linked to said key; and
    providing said activation code only to those users having an unactivated said serial number.

9. A method as claimed in claim 7, wherein said data element is stored within a program executable of said software program.

10. A method of protecting a software program from piracy comprising the steps of:
    selecting at least one data element from said software program for encryption, said data element affecting operation of said software program and comprising usable data that supports any of usable, viewable and executable forms of content;

encrypting said selected data element such that a user is required to obtain a valid license to decrypt said selected data element;

distributing said selected data element and said software program to said user;

decrypting said selected data element during runtime of said software program upon said user obtaining a valid license; and erasing the decrypted said selected data element after said software program executes correctly such that said selected data element is only available at runtime of said software program and in the presence of said valid license;

wherein verification of said valid license causes at least one of programmable switches and application values in said software program to be selectively changed to create a sequence of states that are verified prior to ending operation of said software program if a valid license is not obtained by said user.

11. A method of protecting a software program from piracy comprising the steps of:

selecting at least one data element from said software program for encryption, said data element affecting operation of said software program and comprising usable data that supports any of usable, viewable and executable forms of content;

encrypting said selected data element such that a user is required to obtain a valid license to decrypt said selected data element;

distributing said selected data element and said software program to said user;

decrypting said selected data element during runtime of said software program upon said user obtaining a valid license; and erasing the decrypted said selected data element after said software program executes correctly such that said selected data element is only available at runtime of said software program and in the presence of said valid license;

wherein said software program is configured, upon verification of said valid license, to quit in different places therein in accordance with a plurality of conditions if said user does not obtain a valid license.

12. A method of protecting a software program from piracy comprising the steps of:

selecting at least one data element from said software program for encryption, said data element affecting operation of said software program and comprising usable data that supports any of usable, viewable and executable forms of content;

encrypting said selected data element such that a user is required to obtain a valid license to decrypt said selected data element;

distributing said selected data element and said software program to said user;

decrypting said selected data element during runtime of said software program upon said user obtaining a valid license; and operating said software program sub-optimally if no valid license is obtained by said user and said selected data element is not decrypted.

13. A method as claimed in claim 12, further comprising the steps of:

hiding the functionality of said selected data element during runtime of said software program by not providing an error message if said license is invalid; and operating said software program such that said selected data element appears to be decrypted but contains invalid data if said license is invalid.

14. A method of protecting a software program comprising the steps of:

bundling different functionalities in at least one software program that require respective license terms such that they are subject to respective licenses;

encrypting each of said functionalities;

providing said software program to a user with all of encrypted said functionalities; and decrypting and enabling each of said functionalities whenever said user obtains the corresponding one of said licenses therefor.

15. A method as recited in claim 14, wherein said functionalities provide a range of programmatic execution control ranging from coarse control of said software program to fine control of a specific function provided by said software program.

16. A method as recited in claim 15, wherein said functionalities for said range of programmatic execution control comprise different datasets stored in respective encrypted buffers.

17. A method as recited in claim 16, wherein said respective encrypted buffers are each provided with a unique instance tag as part of the cryptographic process to generate keys therefor.

18. A method as recited in claim 14, wherein said functionalities provide a fully licensed version of said software program and a trialware version of said software program.

19. A method as recited in claim 18, wherein said functionalities for said fully licensed version and said trialware version comprises datasets stored in respective encrypted buffers.

20. A method as recited in claim 19, wherein said respective encrypted buffers are each provided with a unique instance tag as part of the cryptographic process to generate keys therefor.

21. A method as recited in claim 14, wherein said functionalities comprise a basic mode of operation and at least one other mode of increased functionality.

22. A method as recited in claim 14, wherein said functionalities correspond to respective ones of multiple versions of a data element associated with said software program.

23. A method as recited in claim 22, wherein said encrypting step comprises individually encrypting each of said multiple versions of said data element with a key specific to a different license, and said providing step further comprises the step of sending the different said encrypted data elements to said user along with said software application.

24. A method as recited in claim 14, wherein at least one of said functionalities has a data element which comprises usable data that supports any of usable, viewable and executable forms of content.

* * * * *